United States Patent
Rizzo, Jr.

(10) Patent No.: US 8,764,515 B2
(45) Date of Patent: Jul. 1, 2014

(54) COMPONENT MACHINING METHOD AND ASSEMBLY

(75) Inventor: John P. Rizzo, Jr., Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 222 days.

(21) Appl. No.: 13/471,416

(22) Filed: May 14, 2012

(65) Prior Publication Data

US 2013/0303055 A1    Nov. 14, 2013

(51) Int. Cl.
*B24B 49/14* (2006.01)

(52) U.S. Cl.
USPC ................. 451/54; 451/7; 451/53; 205/640; 205/655

(58) Field of Classification Search
CPC ............ B24B 49/14; B24B 1/00; B23H 9/02; B23H 3/00; C25F 3/14; C25F 3/16
USPC ........................ 451/54, 53, 7, 5; 205/640, 655
See application file for complete search history.

(56) References Cited

U.S. PATENT DOCUMENTS

| | | | | |
|---|---|---|---|---|
| 2,784,155 A | * | 3/1957 | Heinrich | 205/684 |
| 2,913,383 A | * | 11/1959 | Topfer | 205/670 |
| 3,345,274 A | * | 10/1967 | Schmidt | 205/124 |
| 3,345,275 A | * | 10/1967 | Rose et al. | 438/371 |
| 3,385,947 A | | 5/1968 | Inoue | |
| 3,928,154 A | * | 12/1975 | Andrews | 205/654 |
| 4,168,212 A | * | 9/1979 | Faktor et al. | 205/790.5 |
| 4,217,183 A | * | 8/1980 | Melcher et al. | 205/92 |
| 4,283,259 A | | 8/1981 | Melcher et al. | |
| 4,430,165 A | * | 2/1984 | Inoue | 205/92 |
| 4,482,445 A | * | 11/1984 | Fjelstad | 205/646 |
| 4,497,692 A | * | 2/1985 | Gelchinski et al. | 205/92 |
| 4,543,171 A | * | 9/1985 | Firester et al. | 438/4 |
| 4,559,115 A | * | 12/1985 | Inoue | 205/651 |
| 4,578,155 A | * | 3/1986 | Halliwell et al. | 205/86 |
| 4,578,157 A | * | 3/1986 | Halliwell et al. | 205/86 |
| 4,672,727 A | | 6/1987 | Field | |
| 5,114,548 A | * | 5/1992 | Rhoades | 205/662 |
| 5,260,108 A | * | 11/1993 | Braren et al. | 427/581 |
| 5,270,112 A | * | 12/1993 | Lukco et al. | 428/368 |
| 5,576,249 A | * | 11/1996 | Wu | 205/656 |
| 5,593,340 A | * | 1/1997 | Nelson et al. | 451/42 |
| 5,605,639 A | | 2/1997 | Banks et al. | |
| 5,935,410 A | * | 8/1999 | Thonissen et al. | 205/655 |
| 6,110,351 A | * | 8/2000 | Hihara et al. | 205/672 |
| 6,251,787 B1 | * | 6/2001 | Edelstein et al. | 438/692 |
| 6,303,193 B1 | | 10/2001 | Guida et al. | |
| 6,428,681 B1 | * | 8/2002 | Lorincz | 205/645 |

(Continued)

FOREIGN PATENT DOCUMENTS

JP    10277841    10/1998

OTHER PUBLICATIONS

International Search Report and Written Opinion for International Application No. PCT/US2013/039596 completed on Aug. 21, 2013.

*Primary Examiner* — George Nguyen
(74) *Attorney, Agent, or Firm* — Carlson, Gaskey & Olds, P.C.

(57) ABSTRACT

An example component machining method includes immersing a surface of a component within a fluid during a machining process. The method heats the surface during the machining to vary the machining process at the surface relative to other surfaces of the component.

12 Claims, 2 Drawing Sheets

(56) References Cited

U.S. PATENT DOCUMENTS

| | | | |
|---|---|---|---|
| 6,558,231 B1* | 5/2003 | Taylor | 451/36 |
| 6,679,985 B2 | 1/2004 | Kim et al. | |
| 7,029,368 B2* | 4/2006 | Bright et al. | 451/7 |
| 7,306,026 B2 | 12/2007 | Memmen | |
| 7,329,361 B2* | 2/2008 | Guha et al. | 216/2 |
| 7,416,652 B2 | 8/2008 | Oelsch | |
| 7,445,696 B2* | 11/2008 | You et al. | 204/228.8 |
| 7,673,669 B2 | 3/2010 | Snyder et al. | |
| 7,871,503 B2 | 1/2011 | Mai et al. | |
| 7,964,085 B1* | 6/2011 | Wang et al. | 205/640 |
| 7,998,330 B2* | 8/2011 | Fang et al. | 205/118 |
| 8,470,160 B2* | 6/2013 | Luo et al. | 205/651 |
| 2002/0066675 A1* | 6/2002 | Lorincz | 205/645 |
| 2003/0024122 A1 | 2/2003 | Ichiyama et al. | |
| 2003/0073384 A1* | 4/2003 | Sandhu et al. | 451/8 |
| 2003/0114077 A1* | 6/2003 | Yang et al. | 451/7 |
| 2003/0217930 A1 | 11/2003 | Luo | |
| 2004/0242124 A1* | 12/2004 | Bright et al. | 451/7 |
| 2005/0054268 A1* | 3/2005 | Kistler et al. | 451/5 |
| 2005/0098445 A1 | 5/2005 | Batzinger et al. | |
| 2005/0145508 A1* | 7/2005 | Larsen et al. | 205/684 |
| 2006/0094338 A1* | 5/2006 | Kim | 451/7 |
| 2006/0201823 A1 | 9/2006 | Zdeblick et al. | |
| 2008/0173386 A1* | 7/2008 | Clark | 156/73.1 |
| 2010/0012506 A1 | 1/2010 | Prichystal | |
| 2011/0073485 A1* | 3/2011 | Luo et al. | 205/651 |
| 2011/0195196 A1* | 8/2011 | Kim | 427/453 |
| 2011/0278178 A1* | 11/2011 | Pierce et al. | 205/571 |
| 2011/0303553 A1* | 12/2011 | Inman et al. | 205/659 |
| 2012/0000793 A1* | 1/2012 | Wang et al. | 205/709 |
| 2012/0138480 A1* | 6/2012 | Matt et al. | 205/658 |

* cited by examiner

COMPONENT MACHINING METHOD AND ASSEMBLY

BACKGROUND

This disclosure relates generally to machining a component and, more particularly, to machining techniques that immerse at least a portion of the component in a fluid.

Many components include surfaces that are machined. The surfaces of both used components and newly manufacturing components may be machined. As an example, a high pressure compressor blade may be machined prior to use within a turbomachine. Turbomachine components often require relatively low surface finishing, such as an average surface roughness ($R_a$) of 1 to 5 micro-inch (0.0254 to 0.127 microns) $R_a$.

Electrochemical machining (or ECM) is an example machining process that immerses at least a portion of a component in a fluid. Electrochemical machining processes use electrical energy to remove material. An ECM process creates an electrolytic cell in an electrolyte medium. A tool serves as a cathode, and the component serves as an anode. During the process, the ECM tool is positioned very close to the workpiece and a low voltage, high amperage DC current is passed between the two via an electrolyte. A high-amperage, low-voltage current is then applied to dissolve and remove metal from the component.

Electrochemical deburring is a type of electrochemical machining designed to remove burrs and impart small radii to corners. The process normally uses a specially shaped electrode to carefully control the process to a specific area. Unlike many other machining methods, workpiece hardness is not a significant factor in ECM, making ECM suitable for difficult-to-machine materials.

Varying the rate of machining the component is difficult during an ECM process.

SUMMARY

A component machining method according to an exemplary aspect of the present disclosure includes, among other things, immersing a surface of a component within a fluid during a machining process and heating the surface during the machining to vary the machining process at the surface relative to other surfaces of the component.

In a further non-limiting embodiment of the foregoing method, the method may include using a heat source that is outside the fluid for the heating.

In a further non-limiting embodiment of either of the foregoing methods, the method may include heating the surface to deburr the component.

In a further non-limiting embodiment of any of the foregoing methods, the machining process may comprise electrochemical polishing.

In a further non-limiting embodiment of any of the foregoing methods, the immersing may comprise immersing the entire component within the fluid.

In a further non-limiting embodiment of any of the foregoing methods, the method may include directing a laser beam at the surface during the heating to heat the fluid near the surface.

In a further non-limiting embodiment of any of the foregoing methods, the method may include directing the laser beam through a wall of a tank holding the fluid.

A component machining assembly according to another exemplary aspect of the present disclosure includes, among other things, a tank configured to hold a fluid and a component during a machining process and a heat source outside the tank, the heat source configured to create a convection current within a selected area of the fluid.

In a further non-limiting embodiment of the foregoing component machining assembly, the convection current may carry a byproduct of the machining away from the surface.

In a further non-limiting embodiment of either of the foregoing component machining assemblies, the heat source may comprise a laser assembly.

In a further non-limiting embodiment of any of the foregoing component machining assemblies, the laser assembly may be configured to direct a laser beam through a wall of the tank to heat the selected area of the fluid.

In a further non-limiting embodiment of any of the foregoing component machining assemblies, the machining process may be an electrochemical machining process.

In a further non-limiting embodiment of any of the foregoing component machining assemblies, the machining process may include a thermal imaging camera configured to monitor thermal energy of at least some of the fluid.

A component assembly having a machined surface according to another exemplary aspect of the present disclosure includes, among other things an electrochemically machined surface of a component, wherein the electrochemically machined surface is varied relative to another electrochemically machined surface of the component due to thermal energy applied to the electrochemically machined surface during the electrochemical machining.

In a further non-limiting embodiment of the foregoing component assembly, the electrochemically machined surface may have an average roughness of from 1 to 5 micro-inch (0.0254 to 0.127 microns) $R_a$.

In a further non-limiting embodiment of either of the foregoing component assemblies, the component may be a refractory metal core.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
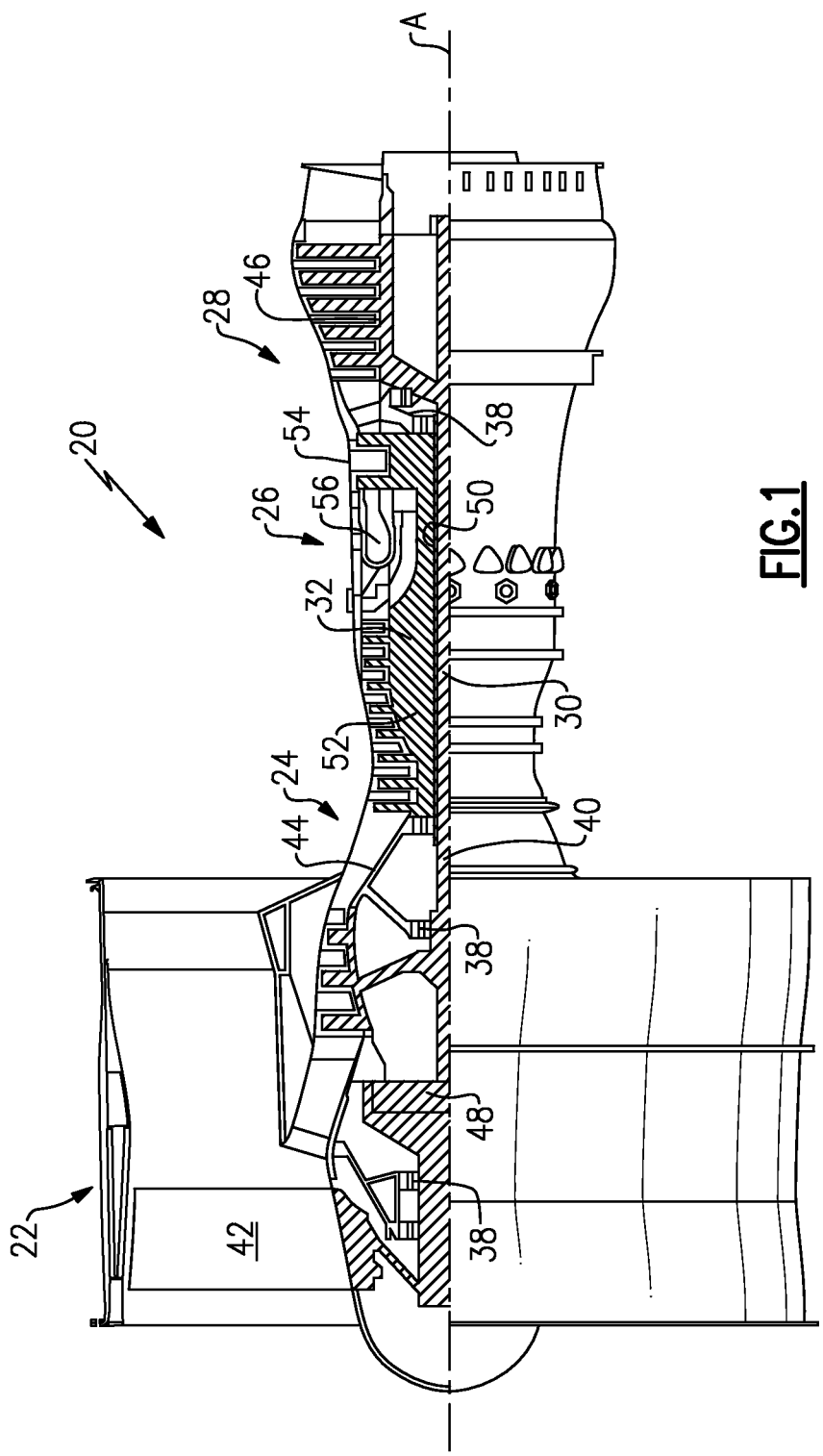
FIG. 1 shows a section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compressor section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures.

In the example engine 20, flow moves from the fan section 22 to a bypass flowpath. Flow from the bypass flowpath generates forward thrust. The compressor section 24 drives air along the core flowpath. Compressed air from the compressor section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes an inner shaft 40 that interconnects a fan 42, a low-pressure compressor 44, and a low-pressure turbine 46. The inner shaft 40 is connected to the fan 42 through a geared architecture 48 to drive the fan 42 at a lower speed than the low-speed spool 30.

The high-speed spool 32 includes an outer shaft 50 that interconnects a high-pressure compressor 52 and high-pressure turbine 54.

The inner shaft 40 and the outer shaft 50 are concentric and rotate via bearing systems 38 about the engine central longitudinal axis A, which is collinear with the longitudinal axes of the inner shaft 40 and the outer shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

Low Corrected Fan Tip Speed is the actual fan tip speed divided by an industry standard temperature correction of Temperature divided by 518.7^0.5. The Temperature represents the ambient temperature in degrees Rankine. The Low Corrected Fan Tip Speed according to one non-limiting embodiment of the example engine 20 is less than about 1150 fps (351 m/s).

The engine 10 includes many components having surfaces that are machined prior to use. Some surfaces of a component may require more machining than other surfaces of the component. Prior art machining processes were not able to suitably accommodate varied machining.

Figure 2:
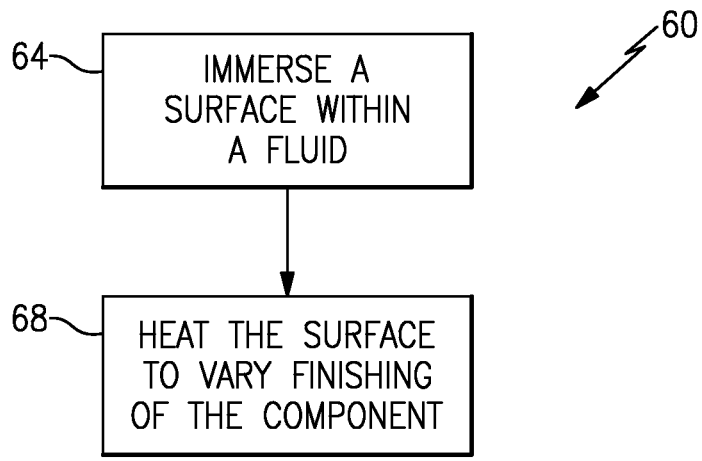
FIG. 2 schematically shows an example method of machining a component of the FIG. 1 turbomachine.

Referring to FIG. 2, an example component machining method 60 of the present disclosure includes a step 64 of immersing a surface of a component within a fluid and a step 68 of heating the surface of the component to vary machining of the component. Heating the surface of the component, in one example, speeds machining of the heated surface relative to other surfaces of the component. The machining etches the component, for example, and heating the surface shrinks the surface to speed up the etching or increase the reaction rate.

During the machining method 60, the component may be partially or entirely immersed within the fluid at the step 64. During the machining method 60, the surface to be machined is within the fluid.

In one example, the machining method is an electrochemical machining method that removes material from the component. In this example, heating the surface at the step 68 relative to other surfaces of the component accelerates the material removal at the surface.

In another example, the surface heated at the step 68 is a surface of a burr. In this example, heating the burr causes the burr to separate from the other portions of the component. The method 60 thus can be utilized to remove burrs from a component.

Figure 3:
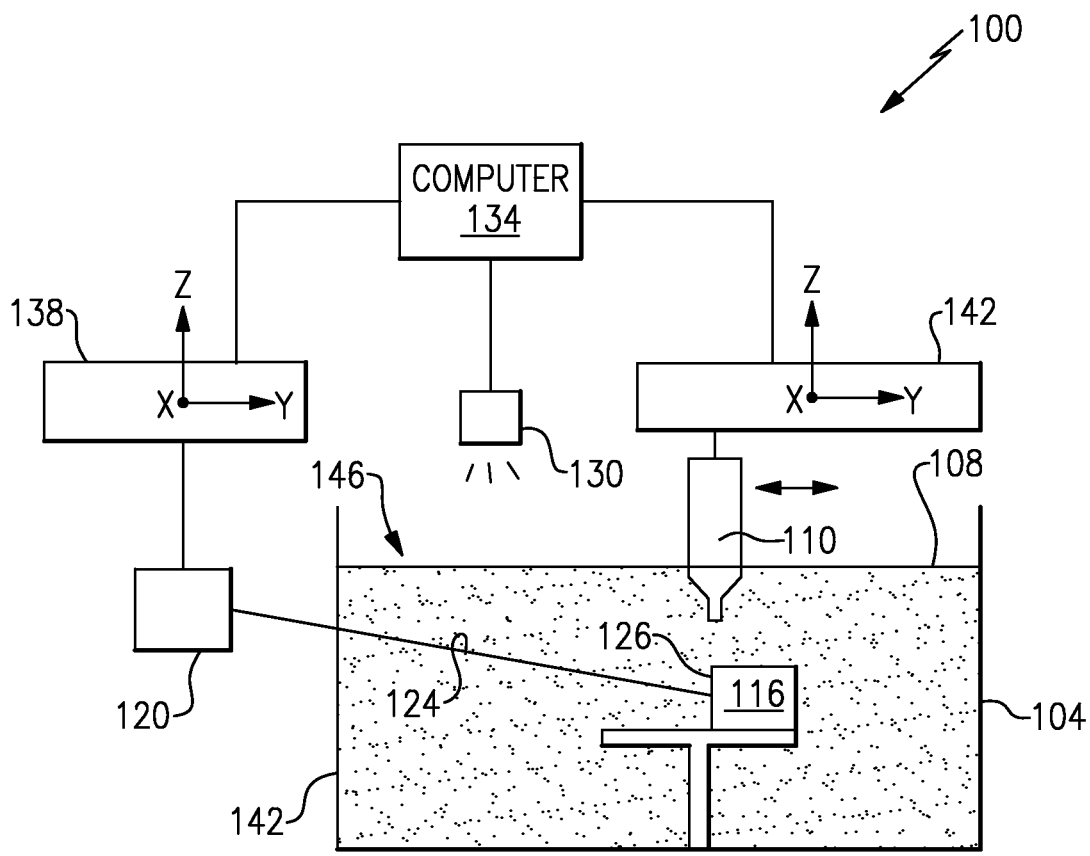
FIG. 3 schematically shows an example assembly using the method of FIG. 2.

Referring now to FIG. 3 with continuing reference to FIGS. 1 and 2, an example machining assembly 100 is an electrochemical machining assembly. The machining assembly 100 includes a tank 104 holding a fluid 108. A shaped electrode 110 is at least partially disposed within the fluid 108. A component 116 (workpiece) having a surface to be machined is also disposed within the fluid 108. The polarity of the shaped electrode 110 is opposite the polarity of the component 116. Probes (not shown) may be used to help machine the surface of the components 116.

The fluid 108 includes an electrolyte. During a machining process, a current is applied to the shaped electrode 110 and the component 116, which causes a chemical reaction within the fluid 108 by which surfaces of the component 116 are electrochemically machined. Particles of the component 116 are driven off into the fluid 108 during the machining. The shaped electrode 110 is moved relative to the component 116 to electrochemically machine different areas of the component 116.

The example machining assembly includes a heat source that heats a surface of the component 116 as the component is electrochemically machined. In this example, the heat source is a laser assembly 120 that directs a laser beam 124 at a surface 126 of the component 116. The laser assembly 120 is a type of heat source. The laser assembly 120 is not immersed within the fluid 108.

The surface 126 of the component 116 is heated relative to other surfaces of the component 116 during the machining process. The other surfaces may be electrochemically machined due to their proximity to the shaped electrode 110, but are not significantly and directly heated by the laser beam 124. This causes the surface 126 to be more significantly electrochemically machined and thus have a varied finish relative to the other surfaces of the component 116.

The example component 116 is a blade from the high-pressure compressor 52 of the gas turbine engine 20. In another example, the component 116 is a refractory metal core that is used when casting the blade. The component 116 could be components other than a blade or refractory metal core in other examples.

A thermal imaging camera 130 may be directed toward the tank 104 to reveal information about the thermal energy of the fluid 108, the component 116, or both. The thermal imaging camera 130 sends this information to a computer 134 that is operatively linked to the laser assembly 120, the shaped electrode 110 through respective positional controllers 138 and 142.

Thermocouples could also be used to monitor thermal energy of the fluid 108, the component 116, or both. The thermocouples could be used to ensure that the process is controlled within relatively tight tolerances. Information from the thermocouples may be used to drive the laser assembly 120 to heat the fluid more or less.

The positional controller 138 adjusts the position of the laser assembly 120 based on commands from the computer 134. Adjusting the laser assembly 120 causes the laser beam 124 to be directed from the area 126 to a different area of the component 116. The thermal energy introduced by the laser beam 124 can be controlled by adjusting the laser assembly 120 to move the laser beam 124 to different areas of the component 116.

The positional controller 138 adjusts the positions of the shaped electrode 110 on commands from the computer 134. The computer 134 may adjust the position of the shaped electrode 110 relative to the component 116 to vary the electrochemical machining of the component 116. Distance between the component 116 and the shaped electrode 110 is another factor capable of varying the rate of electrochemical machining.

The laser beam 124, in some examples, may be directed toward a surface of the component 116 having burrs. The laser beam 124 may facilitate deburring these areas of the component 116. The laser beam 124 could also improve machining at chamfered and radiused areas of the component 116.

In this example, the heat source, which is the laser assembly 120, is outside the tank 104 and thus spaced from the fluid 108. The laser assembly 120 directs the laser beam 124 through a wall 142 of the tank. In some examples, the wall 142 is a glass wall to enable the laser beam 124 to pass through the wall 142 with relatively minimal distortion.

In other examples, the laser beam 124 is directed through an open area 146 of the tank 104 directly into the fluid 108. In such examples, bubbles at the surface of the fluid 108 may undesirably influence the path of the laser beam 124.

In this example, the component 116 after being removed from the fluid 108 has an average surface roughness of from 1 to 5 micro-inch (0.0254 to 0.127 microns) $R_a$. The surface 126, which was heated by the laser beam 124 during the electrochemical machining, has a roughness that is lower than the roughness than other portions of the component 116.

Features of the disclosed examples include an improved machining operation for a component due to thermal energy introduced to a component within a fluid. The improvements may include decreasing a cycle time. The improvements may further include using less electrolyte fluid and other chemicals due to the more effective machining.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A component machining method, comprising:
   immersing a surface of a component within a fluid during a machining process;
   heating the surface during the machining to vary the machining process at the surface relative to other surfaces of the component; and monitoring thermal energy of at least some of the fluid using a thermal imaging camera.

2. The component machining method of claim 1, including using a heat source that is outside the fluid for the heating.

3. The component machining method of claim 1, including heating the surface to deburr the component.

4. The component machining method of claim 1, wherein the machining process comprises electrochemical polishing.

5. The component machining method of claim 1, wherein the immersing comprises immersing the entire component within the fluid.

6. The component machining method of claim 1, directing a laser beam at the surface during the heating to heat the fluid near the surface.

7. The component machining method of claim 6, including directing the laser beam through a wall of a tank holding the fluid.

8. A component machining assembly, comprising:
   a tank configured to hold a fluid and a component during a machining process;
   a heat source outside the tank, the heat source configured to create a convection current within a selected area of the fluid; a thermal imaging camera configured to monitor thermal energy of at least some of the fluid.

9. The component machining assembly of claim 8, wherein the convection current carries a byproduct of the machining away from the surface.

10. The component machining assembly of claim 8, wherein the heat source comprises a laser assembly.

11. The component machining assembly of claim 10, wherein the laser assembly is configured to direct a laser beam through a wall of the tank to heat the selected area of the fluid.

12. The component machining assembly of claim 8, wherein the machining process is an electrochemical machining process.

* * * * *